(12) United States Patent
Hillis et al.

(10) Patent No.: US 7,722,374 B2
(45) Date of Patent: *May 25, 2010

(54) HERMAPHRODITIC COUPLING WITH ROTATIONAL ENGAGEMENT AND FLEXIBLE INTERLOCK

(75) Inventors: W. Daniel Hillis, Encino, CA (US); Luke Khanlian, Grenada Hills, CA (US)

(73) Assignee: Applied Minds, Inc., Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/468,726

(22) Filed: May 19, 2009

(65) Prior Publication Data

US 2009/0227134 A1 Sep. 10, 2009

Related U.S. Application Data

(63) Continuation of application No. 11/775,177, filed on Jul. 9, 2007, now Pat. No. 7,549,883.

(60) Provisional application No. 60/819,418, filed on Jul. 7, 2006.

(51) Int. Cl.
    *H01R 13/28* (2006.01)
(52) U.S. Cl. ..................................... 439/285

(58) Field of Classification Search ......... 439/284–288; 385/60
See application file for complete search history.

(56) References Cited

U.S. PATENT DOCUMENTS

| 5,118,303 | A | 6/1992 | LeBaron et al. |
| 5,865,329 | A * | 2/1999 | Gay et al. ..................... 213/1.3 |
| 6,146,191 | A | 11/2000 | Kerr et al. |
| 6,443,626 | B1 | 9/2002 | Foster |
| 6,605,914 | B2 | 8/2003 | Yim et al. |
| 6,881,084 | B2 * | 4/2005 | Crossan et al. .............. 439/292 |
| 7,395,584 | B2 | 7/2008 | Khalifa et al. |
| 7,476,035 | B2 * | 1/2009 | Cull et al. ...................... 385/60 |
| 7,549,883 | B2 * | 6/2009 | Hillis et al. .................. 439/285 |
| 7,585,116 | B2 * | 9/2009 | Cull et al. ...................... 385/60 |

* cited by examiner

*Primary Examiner*—Chandrika Prasad
(74) *Attorney, Agent, or Firm*—Michael A. Glenn; Glenn Patent Group

(57) ABSTRACT

A low-profile genderless connector uses interlocking tabs and spring levers to form a secure mechanical link with another identical genderless connector using rotational engagement. Upon full engagement of two opposing yet identical connectors, electrical contacts on each connector complete multiple signal paths for ground, power, and signal communication in a preferred sequential order. In an alternative embodiment, the connectors rotationally engage to form a coupling having optical contacts. In yet another embodiment, the connectors rotationally engage to form a coupling to provide strictly mechanical or structural connectivity.

22 Claims, 5 Drawing Sheets

HERMAPHRODITIC COUPLING WITH ROTATIONAL ENGAGEMENT AND FLEXIBLE INTERLOCK

CROSS-REFERENCE TO RELATED APPLICATIONS

Figure 1:
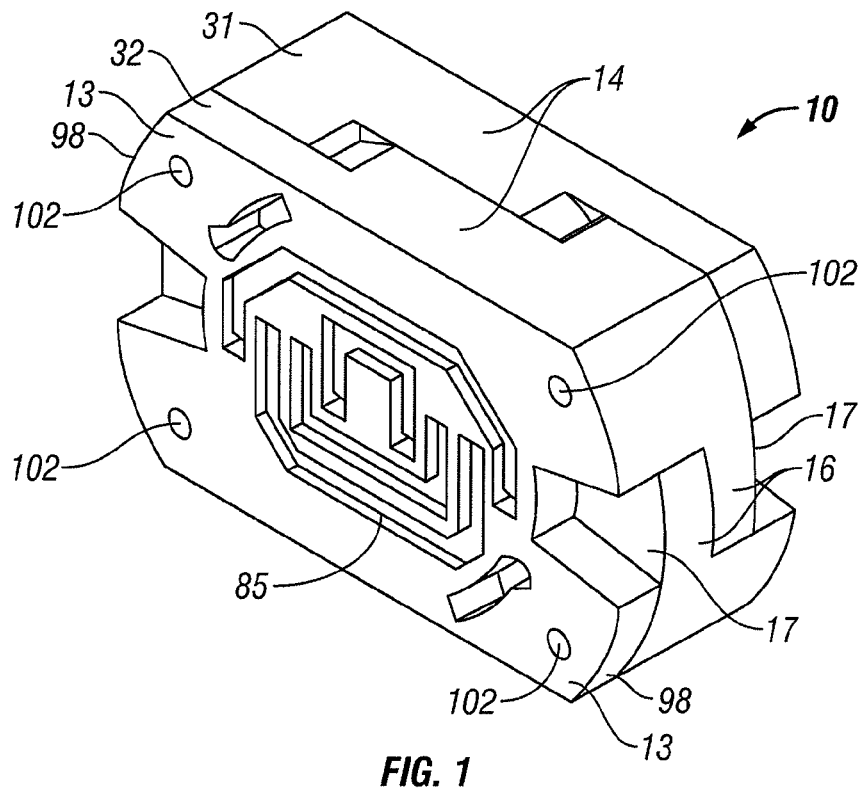

This application is a Continuation of U.S. patent application Ser. No. 11/775,177 filed Jul. 9, 2007, issued as U.S. Pat. No. 7,549,883 on 23 Jun. 2009, which claims priority to related provisional patent application, Ser. No. 60/819,418 filed Jul. 7, 2006, which is not admitted to be prior art with respect to the present invention by its mention in the background. This application is incorporated herein by this reference.

BACKGROUND

The invention relates to an improved coupling, specifically a simple, genderless device to provide mechanical, electrical or optical connection between two components without the need for separate and dissimilar male and female connectors.

Devices to connect two components, either mechanically, electrically, optically or all three exist in numerous varieties. These connecting devices can be broadly divided into two categories: gendered and genderless.

Gendered couplings consist of two dissimilar but complementary connectors that fit together to create a continuous, connected signal or structural pathway to provide mechanical connection or to support transmission of power or data signals, including digital, analog, optical and electrical. Gendered couplings take the form of male and female connectors, where a first probe mates with a corresponding receptacle. Examples of gendered couplings include USB connectors, RCA audio jacks, Ethernet jacks, and power plugs, among many others. By virtue of their design, gendered couplings require dissimilar connectors and frequently, connection in a specific orientation. A well-known connector for power cables is the standard plug and receptacle. When stringing together such items as decorative Christmas lights or connecting multiple extension cords, it is always necessary to arrange the cords in a manner that ensures a male plug is adjacent a female receptacle. In some configurations, gendered connectors require specialized adapters, such as to join two functionally equivalent cables together. For example, telephone extension cords are well-known as having gendered plugs, but having the same gender on both ends of a cable. Consequently, an additional adapter having the complementary gender on both ends is required to connect such cables to gain greater length. Another type of gendered coupling is used to provide mechanical connection of toy trains using magnetic attraction. Although the connectors on the end of each train appear visually to be genderless, in fact, each will only engage if a positive magnetic pole is placed adjacent a negative magnetic pole. Consequently, such connectors are functionally gendered.

Genderless, or hermaphroditic, couplings typically have one connector type designed to engage with an equivalent connector in a complementary fashion. Since each connector is identical, there is no need for specialized adapters when connecting identical genders together. An example of a well-known hermaphroditic connector is the "handshake" devices on rail cars that enable any rail car to mechanically link to any other car in any order. Current hermaphroditic connectors are complex and expensive to produce. Further, actual engagement of opposing hermaphroditic connectors can likewise be difficult. Still further, many such connectors engage in a linear fashion causing electrical connections to be made simultaneously on all contacts creating potential short-circuits and safety hazards. Additionally, many such hermaphroditic connectors require relatively long shells to house the components used to mechanically engage respective connectors. Without special complex adaptation, many gendered and genderless connectors are easily separated, creating inconvenient disconnects. Further, existing hermaphroditic connectors cannot be easily or cost-effectively scaled or modified to accommodate varying power and signal pathways.

Information relevant to attempts to address these problems can be found in U.S. Pat. Nos. 6,605,914B1 and 6,881,084B2. However, each one of these references suffers from one or more of the following disadvantages: long housings, complex configuration, expensive construction, poor contact tolerance, potentially unsafe contact action, and, lack of resistance to linear separation.

For the foregoing reasons, there is a need for a novel hermaphroditic coupling that is low cost, comprised of few components, easily assembled, safe in operation, capable of providing close tolerance engagement, structurally robust, resistant to rotational, lateral or linear disengagement, scalable to accommodate increasing numbers of connection pathways, and, easily modifiable to deliver various connection contact configurations.

SUMMARY

The present invention is directed to a novel hermaphroditic coupling comprised of two shallow, low profile connector members that satisfy this need for low-cost, simplicity, ruggedness, adaptability, scalability, low-profile, safety, close connection tolerance, and, resistance to separation. The coupling comprises two identical low-profile connectors: a first genderless connector which rotationally engages and joins with a second, equivalent genderless connector. The completed coupling forms mechanical, electrical and optical linkage to power cables, signal cables, strength members or other objects attached to the backplane or attachment face of each connector. Each connector has a generally low-profile, flat shape and in one version the overall shape is that of a truncated circle or disc. A rear face on each connector provides a surface for connection or attachment of objects, including cables, toy components and other objects. Each connector includes a gap for rotationally receiving and engaging an interlocking extension and tab of an opposing connector. Each connector further includes flexible spring levers with locking protrusions, where the levers are bent inward during initial rotational engagement and then the protrusions seat in a corresponding notch on the opposing connector when fully engaged. Each connector has holes or penetrations for receiving surface interface devices such as electrical or signal transmission contacts. In one version, the holes are placed in a linear fashion such that individual holes, and hence, the contacts, may be aligned in a preferred sequence based upon the rotational action of engagement. Thus, the desirable, shallow profile coupling is easily formed by an intuitive and simple operation to provide secure engagement between interface or contact surfaces, while also providing resistance to linear and rotational separation.

DRAWINGS

Figure 2:
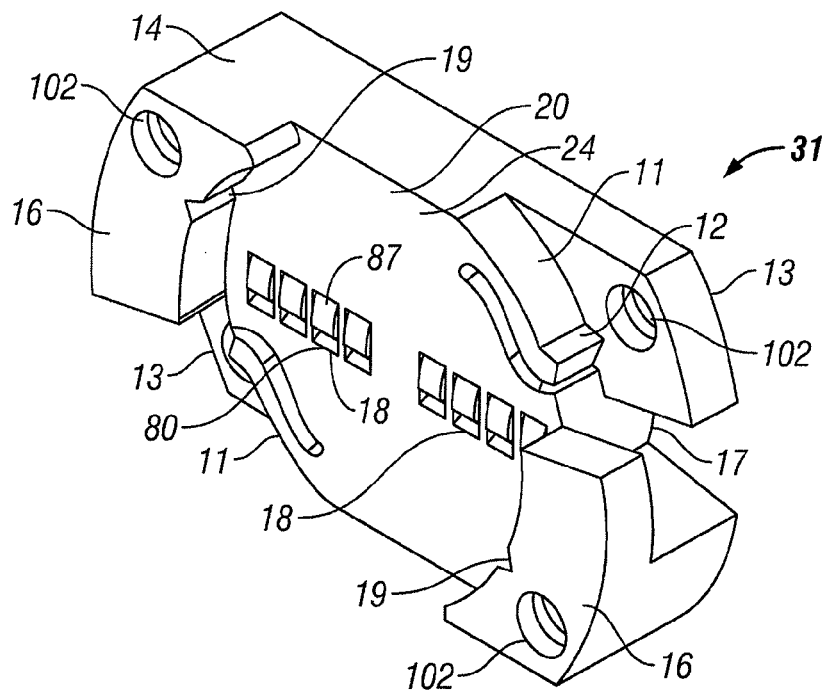
Figure 3:
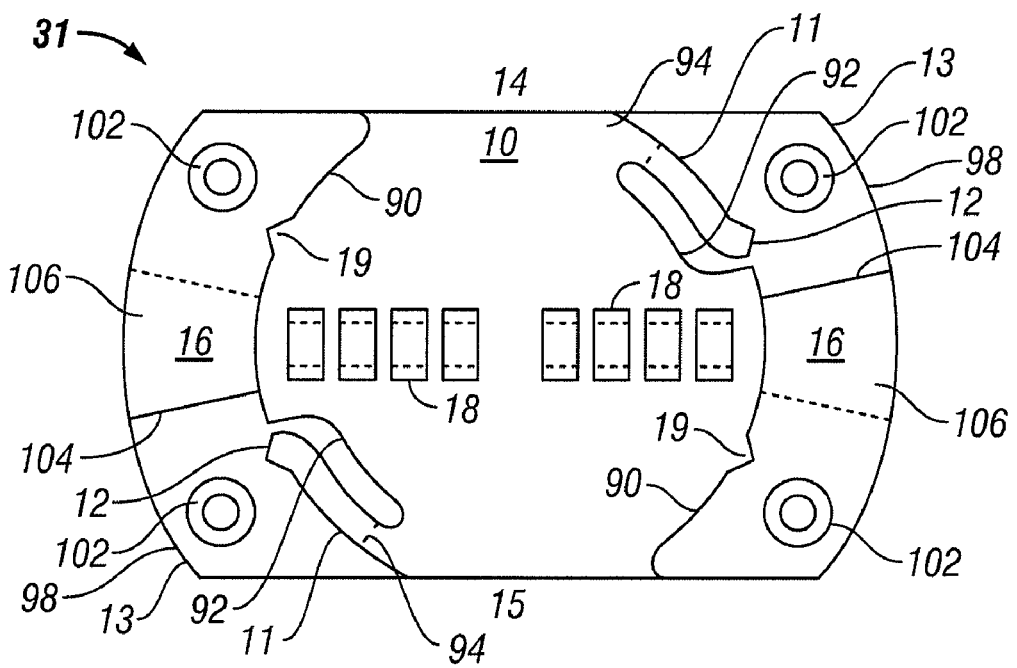
Figure 4:
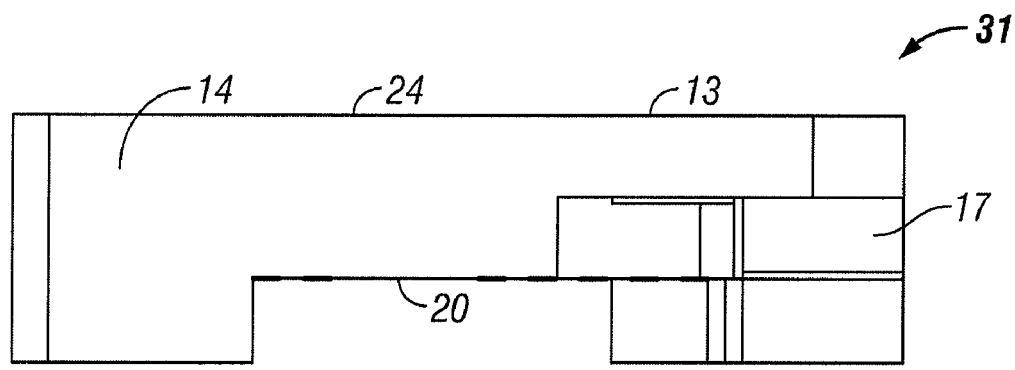
Figure 5A:
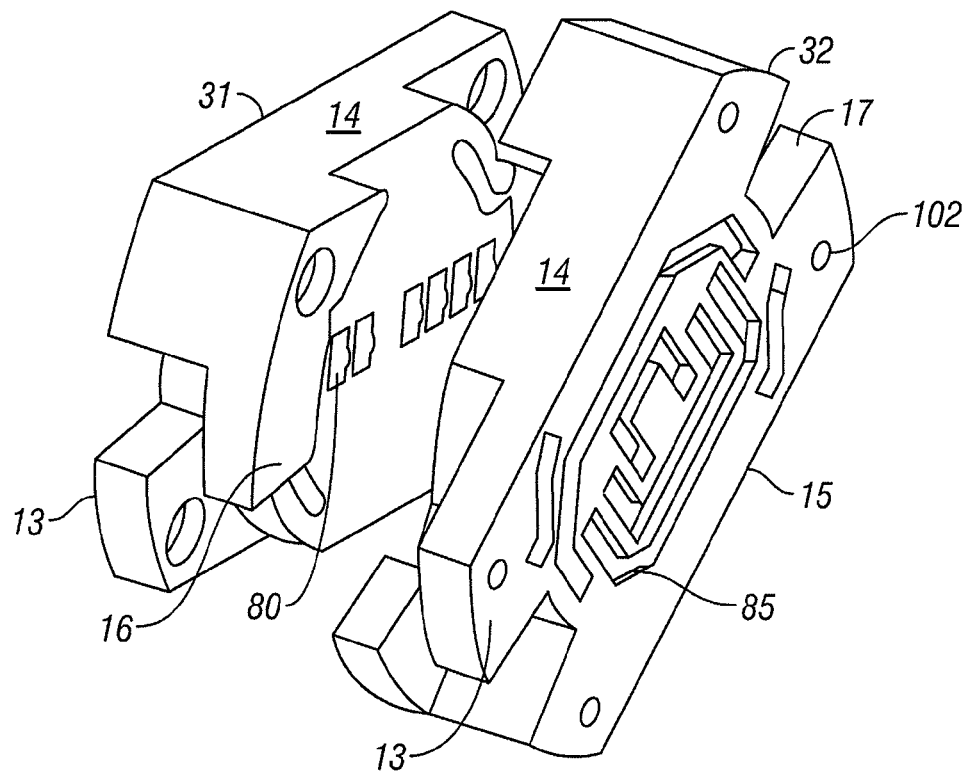
Figure 5B:
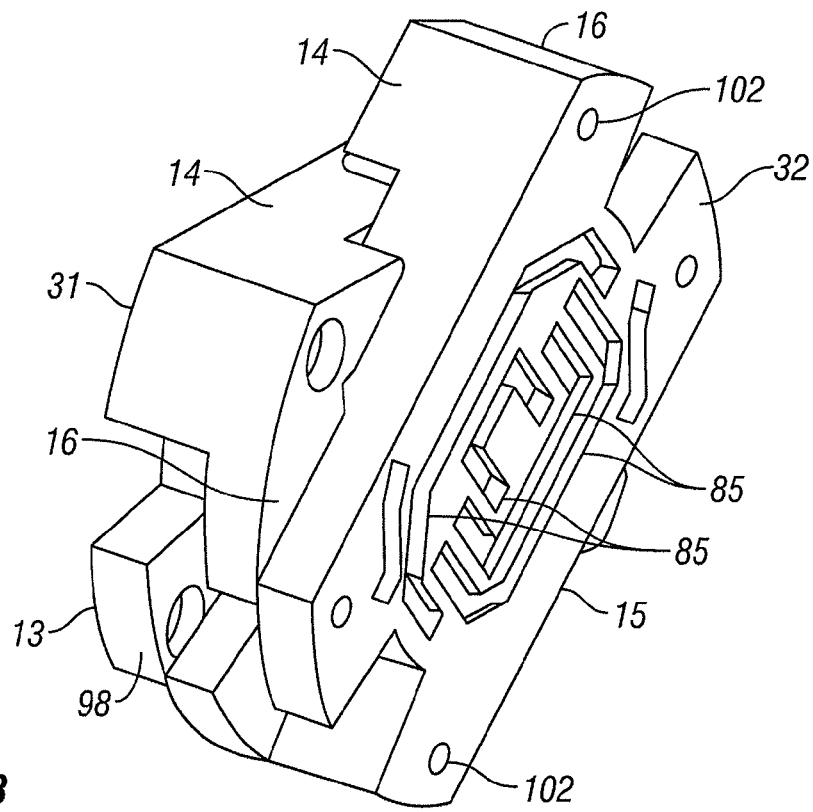
Figure 5C:
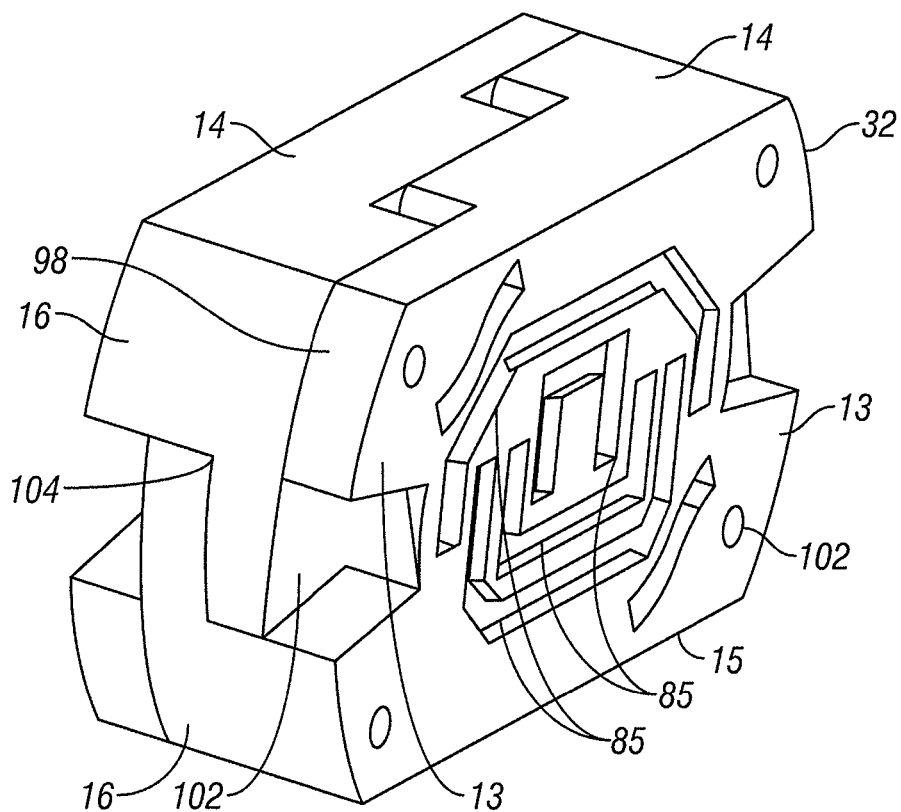
Figure 6:
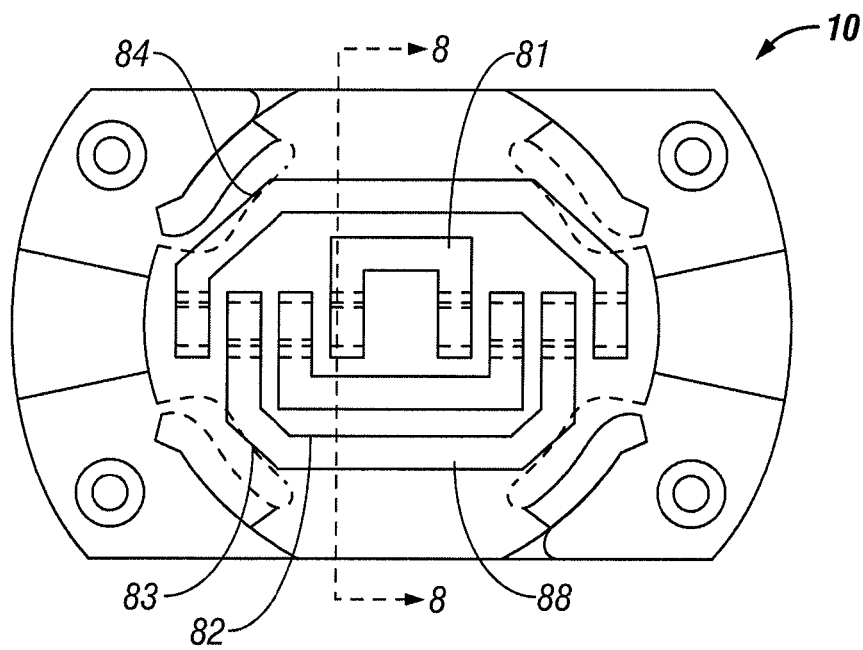
Figure 7:
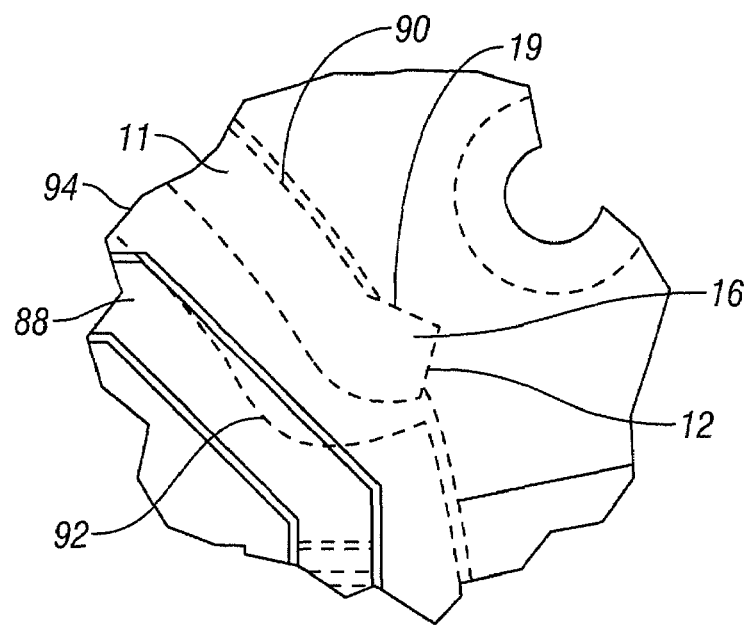
Figure 8:
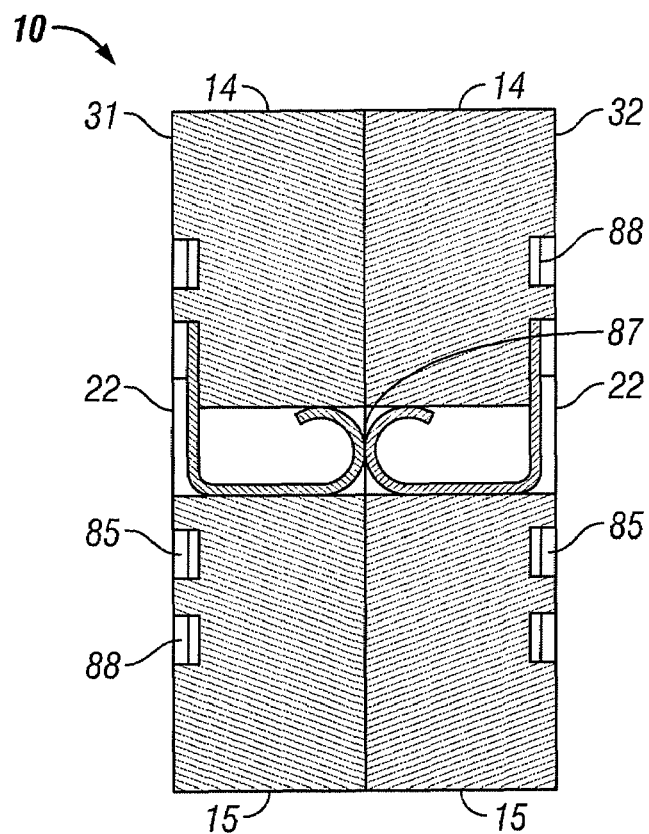

These and other features, aspects, and advantages of the present invention will become better understood with regard to the following description, appended claims and accompanying drawings where:

FIG. 1 provides a perspective view of a completed coupling comprising two genderless connectors according to a preferred embodiment of the invention;

FIG. 2 provides a perspective view of a connector of the coupling of FIG. 1, according to a preferred embodiment of the invention;

FIG. 3 provides a front view of the connector of FIG. 2, according to a preferred embodiment of the invention;

FIG. 4 provides a top view of the connector of FIG. 2, according to a preferred embodiment of the invention;

FIGS. 5A-5C provide a perspective view and illustration of the coupling process between two connectors, according to a preferred embodiment of the invention;

FIG. 6 provides a front view of a fully engaged coupling as shown in FIG. 1, according to a preferred embodiment of the invention;

FIG. 7 provides an enlarged view of a spring lever protrusion of a first connector engaging a notch of a second connector when fully engaged as shown in FIG. 6, according to a preferred embodiment of the invention; and, FIG. 8 is a cross-sectional view of the connector of FIG. 6 taken along the line 8-8 according to a preferred embodiment of the invention.

DESCRIPTION

The invention provides a reliable mechanical connection resistant to tensile, lateral and rotational separation forces while simultaneously providing secure electrical or optical connection with multiple contacts for power, signal, and ground.

A shown in FIG. 1, in a first embodiment according to the present invention, coupling 10 comprises a first genderless connector 31 and a second genderless connector 32. For consistency, given that connectors 31, 32 are hermaphroditic and hence identical in all aspects to another opposing connector, equivalent elements on either connector 31, 32 have been given equivalent reference numerals. Each equivalent element will occasionally be related to either the first connector 31 or the second connector 32 when describing the use and operation of the connectors 31, 32.

Now, and in further detail, as shown in FIG. 2, a connector 31 includes a mating or joining face 20 and a rear attachment face 22. An engaging spring lever 11 having a protrusion 12 extends from the joining face 20. Corresponding overhanging and interlocking tabs 16 of each connector 31, 32 are configured to rotateably engage and interlock with corresponding gaps 17 of an opposing connector 31, 32. A notch 19 of the overhanging tab 16 is sized to receive the protrusion 12 of the spring lever 11. Each joining face 20 includes connector holes or penetrations 80 for receiving various forms of interface contacts.

Now, with reference to FIGS. 1-4, the coupling 10 and connectors 31, 32 of a first embodiment of the present invention are described in even greater detail. Each connector 31, 32 comprises a joining face 20, an opposing attachment face 22, a top edge 14, and, a bottom edge 15. With specific reference to FIG. 3, each connector 31, 32 in a first embodiment is shaped in the form of a truncated circle or disc with a flattened top 14 and bottom 15. The parallel top 14 and bottom 15 form flat surfaces which truncate the overall circular shape of each connector 31, 32 to form a disc area 24. The joining face 20 of a first connector 31 engages with an opposing joining face 20 of another equivalent but separate second connector 32. The rear attachment face 22 of each connector 31, 32 is affixed to an object (not shown). The objects may include wires, cables, optical fibers, rigid or flexible strength members, facial portions of toys such as trains, or any other such object which requires attachment to another object.

Now, with particular attention to FIGS. 2 and 3, each connector 31, 32 includes a flat joining face 20 in the shape of a truncated circle forming a disc area 24 with flattened top 14 and bottom 15. Spring levers 11 including outwardly pointing engaging protrusions 12 located at opposing corners of each connector 31, 32. Each spring lever 11 extends from the disc area 24 shaped with curvature generally following a circular path about the lower left and upper right corners of the joining face 20. Although the levers 11 are shown here as extending in a clock-wise direction, one skilled in the art will readily recognize that the levers 11 and connectors 31, 32 can be configured in a different additional embodiment such that the spring levers 11 would extend in a counter-clockwise direction about the curved perimeter of the disc area 24. A first fixed end 94 of each spring lever 11 extending from the disc area 24 originates adjacent the top 14 and bottom 15 surfaces of the each connector 31, 32. A free end 96 of each lever 11 includes a protrusion 12 directed outwardly. A recess 92 is formed in the disc area 24 of each connector to receive the free end 96 of the spring lever 11. When connection is completed, and the first connector 31 and the second connector 32 have been rotateably engaged to form the coupling 10, the protrusions 12 on the levers 11 of the first connector 31 are accommodated and frictionally engaged in the notches 19 within the inner edges 90 of the overhanging interlocking tabs 16 of the second connector 32.

Now, with reference to FIG. 2, each connector 31, 32 includes two opposing extensions 13. The extensions 13 extend outwardly from the rear attachment face 24 of each connector 31, 32. The extensions 13 border the levers 11. In a first embodiment of the present invention, the extensions 13 extend horizontally from and form a portion of the top 14 and bottom 15 of each connector 31, 32 thereby continuing the planes of truncation. As shown in FIGS. 2 and 3, outer edges 98 of the extensions 13 form arcs concentric with the overall circular shape of each connector 31, 32. The extensions 13 include fastening holes 102 to allow physical attachment of a connector 31, 32 to another object by insertion of fasteners such as screws (not shown). The holes 102 may also be used to more permanently engage the first connector 31 to a second connector 32 to form the coupling 10.

With further reference to FIGS. 2 and 3, the connectors 31, 32 include two opposing overhanging, interlocking tabs 16. The tabs 16 of the first connector 31 protrude outward from the joining face 20 towards the joining face 20 of the second connector 32. The tabs 16 are situated opposite the extensions 13 but likewise extend horizontally in the plane of truncation but in a curvature concentric with the overall circular shape of the connector 31, 32. A distal end 104 of each tab 16 arcs towards a midline of the connector 31, 32 parallel to and equidistant from the two planes of truncation of the top 14 and bottom 15 of the connector 31, 32. The distal ends 104 of the overhanging tabs 16 form an engaging portion 106. The tabs 16 are shown having a tapering shape which serves to allow the connectors 31, 32 to be easily and accurately connected.

As shown in both FIGS. 2 and 4, the extension 13 and the corresponding but opposing overhanging and interlocking tab 16 of a connector 31, 32 forms a gap 17. The gap 17 of a first connector 31 is sized and shaped to fully receive and frictionally engage and interlock with the engaging portion 106 of a corresponding tab 16 of a second connector 32.

As shown in FIGS. 2 and 3, the tabs 16 include recessed notches 19 on inner edges 90. The notches 19 are sized to receive and frictionally engage the protrusions 12 of the spring levers 11 when a first connector 31 is fully engaged with a second connector 32. The force of frictional engagement may be varied by modifying the thickness of the spring lever 11 or changing the shapes of the protrusions 12 and the recessed notches 19. In a further embodiment, the notches 19 may have a shape of a rectangular slot to correspond to a rectangular protrusion 12 such that a fully engaged coupling 10 is permanently engaged and may not be released by reverse rotation.

In a first embodiment, each connector 31, 32 includes penetrations 80 through the joining face 20 of the connector 31, 32 to the attachment face 22. As shown in FIG. 2, the face 20 of the connector 31, 32 includes two sets 18 of four rectangular penetrations 80 to create a total of eight penetrations 80. In a first embodiment, each set 18 of four penetrations 80 is aligned in a horizontal row located along a midline of the connector 31, 32, where one of each set 18 is located on each side of the connector's 31, 32 center. The penetrations 80 are sized to receive various forms of contacts 87 to facilitate power and signal transmission. In a first embodiment of the invention, electrical contacts 87 are placed in each penetration 80, slightly protruding outward from the joining face 20 of the connector 31, 32.

Mechanical Connection—In use and operation, FIGS. 5A-5C illustrate three steps of engaging a first connector 31 with a second connector 32 to form the novel hermaphroditic coupling 10 of a preferred embodiment of the invention. FIG. 5A shows a first step of connection and engagement between the two connectors 31, 32. First, the two connectors 31, 32 are oriented for engagement with joining faces 20 oriented toward each other and each connector 31, 32 slightly rotationally offset from the other. Next, as shown in FIG. 5B, the connectors 31, 32 are brought together with joining faces 20 abutting and the connectors 31, 32 rotationally offset from one another by approximately forty-five degrees such that each hermaphroditic connector 31, 32 simultaneously receives the top 14 and bottom 15 of the opposing is connector 31, 32. Once each connector 31, 32 is engaged by its opposing and identical connector 31, 32, the connectors 31, 32 are rotated in opposing directions. Since each connector 31, 32 is rotationally symmetric, the connection may be initiated without regard to a "right-side-up" orientation. On first contact, the overhanging and interlocking tabs 16 extend over the top 14 and bottom 15 surfaces of the opposing connector 31, 32, continuing in an arc over the first fixed end 94 of the adjacent spring lever 11.

The two connectors 31, 32 are rotated in a direction opposite each other such that distal ends 104 of the tabs 16 travel towards receiving gaps 17. As the connectors 31, 32 approach alignment with one another, the inner edge 90 of each tab 16 contacts the protrusion 12 on the spring lever 11, compressing the lever 11 towards the center of the connector 31, 32 and into its recess 92. Each interlocking tab 16 then continues to slide into the gap 17 between the opposing tab 16 and the extension 13. The connectors 31, 32 are continually rotated until fully engaged to form the coupling 10.

Now, as shown in FIG. 5C, a fully engaged coupling 10 has the top 14 and bottom 15 of the coupled connectors 31, 32 fully aligned. During rotational engagement, as the tabs 16 interlock and completely overlap and are eventually fully received within the gaps 17, the protrusion 12 of each spring lever 11 slides and springs into the corresponding notch 19 along the inner surface 90 of each tab 16. This final rotational engagement creates a locking action and a feeling of positive engagement as evidenced by the sense of engagement of the protrusions 12 in the notches 19. Additionally, as the protrusions 12 fully and frictionally seat in the notches 19, the engagement of the tabs 16 within the gap 17 and with each other fully prohibits linear axial, rotational and lateral separation of the connectors 31, 32.

To disengage the connectors 31, 32, the connectors 31, 32 are rotated in an opposite direction so as to restore the initial rotational offset, and, to rotate the tabs 16 out of the gaps 17 and to remove the overlap between the tabs 16. The connectors 31, 32 may then be separated from each other.

An alternative embodiment of the invention includes a mirror-image arrangement where the locking action requires rotation in the opposite direction as that described above.

Electrical Connection—As noted above, the connectors 31, 32 may also be used to form a coupling 10 to provide electrical connectivity between coupled objects. Now, and referring to FIG. 6, in a preferred embodiment, the connector 31, 32 is designed to receive one or more electrical contacts 87 in one or more penetrations 80. Each set 18 of contacts 18 is a mirror image of the other. As shown in FIG. 6, in a first embodiment eight penetrations 80 support eight contacts 87. The contacts 87 are arranged as follows: an innermost contact 81 (closest to the center of the disc) provides connectivity to a grounding circuitry; the next two contacts 82, 83 further from the center of the connector joining face 20 are signal paths; and finally, the outermost contact 84 is used to provide power. Each contact 87 in one set 18 of four contacts 87 is electrically connected to its equivalent contact 87 in the symmetric set 18 of four contacts 87 using a conducting material ribbon 88 set in channels 85 of the attachment face 24 of each connector 31, 32. As shown in FIG. 8, when used for providing transmission of electrical power or signals, the connector 10 includes at least one electrical contact 87 between a first and second connector 31, 32 according to a preferred embodiment of the invention.

In operation and using the above described arrangement, when two connectors 31, 32 are engaged and rotated to secure a connection, the innermost matching set of contacts, the ground contacts 81, make the first initial electrical contact. Next, as rotation continues, the next matching set of contacts to engage are the signal connectors 82, 83, and lastly, the power contacts 84. This order of connection helps to avoid short circuits. FIG. 8 illustrates a section along the plane 8-8 cut through the coupling 10 to show the electrical connection between two protruding contacts 87. Other arrangements of contacts 87 are possible, such as more or fewer contacts in different locations.

The previously described versions of the present invention have many advantages, including simple engagement, flexible use, low profile, safe connectivity, scaleable to multiple contacts, resistant to lateral, linear and rotational separation, and low cost among other things. The invention does not require that all the advantageous features and all the advantages need to be incorporated into every embodiment of the invention.

Although the present invention has been described in considerable detail with reference to certain preferred versions thereof, other versions are possible. For example, the connectors can be imbedded in a wall outlet to provide secure and inseparable connectivity with networking or power cables. In addition, the connectors can be attached to cables of differing lengths to allow creation of any cable length having equivalent functionality. Further, the connectors can be used strictly to provide secure mechanical connection for structural components including toys or other structures. Therefore, the spirit and scope of the appended claims should not be limited to the description of the preferred versions or embodiments contained herein.

The reader's attention is directed to all papers and documents which are filed concurrently with this specification and which are open to public inspection with this specification, and the contents of all such papers and documents are incorporated herein by reference. All the features disclosed in this specification including any accompanying claims, abstract, and drawings may be replaced by alternative features serving the same, equivalent or similar purpose, unless expressly stated otherwise. Thus, unless expressly stated otherwise, each feature disclosed is one example only of a generic series of equivalent or similar features.

Further, any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. No claim herein is to be construed under the provisions of 35 U.S.C. 112, sixth paragraph, unless the element is expressly recited using the phrase "means for."

INDUSTRIAL APPLICABILITY

The present invention applies industrially to connectors to form a coupling between objects. More particularly, the present invention applies industrially to connectors for forming secure connections between object. Even more particularly, the present invention applies to hermaphroditic connectors for use in connecting power, ground and signal systems.

The invention claimed is:

1. A hermaphroditic coupling, comprising:
   identical, unitary first and second hermaphroditic connectors;
   each of said hermaphroditic connectors comprising a member having a joining face and an attachment face, each attachment face adapted to establish a connection, each joining face having a first engaging element and a second engaging element associated therewith, wherein said first engaging element is flexible;
   wherein said joining faces of said hermaphroditic connectors are rotationally engageable to cause said first engaging element of said first connector to engage with said second engaging element of said second connector, and to cause said first engaging element of said second connector to engage with said second engaging element of said first connector; and
   wherein said engaging elements of each said connector flexibly interlock and form a coupling, that establishes a connection between said first and said second hermaphroditic connectors.

2. The coupling of claim 1, wherein said member is rectangular.

3. The coupling of claim 1, wherein said member has the shape of a truncated circle.

4. The coupling of claim 1, wherein said first engaging element is a spring lever.

5. The coupling of claim 1, wherein said second engaging element is tapered to engage with a similarly tapered first engaging element.

6. The coupling of claim 1, wherein said joining face further comprises a recess for receiving said first engaging element when compressed by said second engaging element during engagement.

7. The coupling of claim 1, wherein each of said hermaphroditic connectors further comprise penetrations for receiving interface contacts.

8. The coupling of claim 7, wherein said interface contacts are electrical or optical.

9. The coupling of claim 1, wherein said members are rotationally symmetric.

10. The coupling of claim 1, wherein said member is made of any of metal, wood, plastic, paper, composite, or ceramic materials.

11. The coupling of claim 1, further comprising:
    two or more protrusions on each of said first engaging elements corresponding to two or more notches of the opposing second engaging elements.

12. A coupling, comprising:
    identical, unitary first and second opposing rotatably joinable connectors;
    each connector comprising an attachment face and a joining face;
    wherein each said attachment face comprises a surface to which to attach objects, and
    wherein each said joining face has a first engaging element and a second engaging element associated therewith, wherein each said first engaging element is flexible;
    wherein upon rotational engagement of said opposing connectors, said first engaging element of said first connector is flexibly engagable with said second engaging element of said second connector, and said first engaging element of said second connector is flexibly engagable with said second engaging element of said first connector;
    wherein said first and second connector are flexibly interlockable to form said coupling.

13. The coupling of claim 12, further comprising:
    said attachment face comprising channels for establishing a communicative path between, said connectors.

14. The coupling of claim 12, further comprising:
    one or more penetrations for receiving connection interfaces.

15. The coupling of claim 14, wherein said connection interfaces are electrical contacts for power and signal transmission.

16. The coupling of claim 14, wherein said connection interfaces are optical contacts for transmitting and receiving optical signals.

17. A hermaphroditic connector, comprising:
    a unitary structure having a joining face and an attachment face;
    said attachment face comprising one or more channels defined thereupon for receiving connecting members; and
    said joining face having a rotationally symmetric engagement profile and comprising a first engaging element and a second engaging element, wherein said first engaging element is flexible;
    wherein two hermaphroditic connectors are rotationally engagable to cause said first engaging elements of said hermaphroditic connectors to flexibly interlock with said second engaging elements said hermaphroditic connectors, to form a connective coupling.

18. The hermaphroditic connector of claim 17, further comprising: a plurality of connecting members adapted for any of ground, signal transmission, and power.

19. The hermaphroditic connector of claim 18, wherein said connecting members are positioned radially outward from the center of the joining face in the order of ground, at least one signal transmission, and power, wherein said ground is engaged first and, wherein power is engaged last in sequence during rotational engagement.

20. The hermaphroditic connector of claim 17, wherein said connector is adapted to be attached to an electrically powered device.

21. The hermaphroditic connector of claim 16, further comprising: a plurality of connecting members comprising any of optical fibers, electrical conductors, strength members, or structural components.

22. The hermaphroditic connector of claim 16, said engaging element comprising at least one set of at least one engaging element for effecting locking engagement of said connector with the joining face of another, identical connector.

* * * * *